United States Patent
Krymski

(10) Patent No.: US 7,397,509 B2
(45) Date of Patent: Jul. 8, 2008

(54) HIGH DYNAMIC RANGE IMAGER WITH A ROLLING SHUTTER

(75) Inventor: Alexander Krymski, La Crescenta, CA (US)

(73) Assignee: Micron Technology, Inc., Boise, ID (US)

( * ) Notice: Subject to any disclaimer, the term of this patent is extended or adjusted under 35 U.S.C. 154(b) by 695 days.

(21) Appl. No.: 10/927,591

(22) Filed: Aug. 27, 2004

(65) Prior Publication Data

US 2006/0044413 A1   Mar. 2, 2006

(51) Int. Cl.
*H04N 5/335* (2006.01)
(52) U.S. Cl. .................................................. 348/308
(58) Field of Classification Search .............. 348/308; 250/208.1
See application file for complete search history.

(56) References Cited

U.S. PATENT DOCUMENTS

| | | | | |
|---|---|---|---|---|
| 6,008,486 A | * | 12/1999 | Stam et al. | ............... 250/208.1 |
| 6,674,470 B1 | * | 1/2004 | Tanaka et al. | ............... 348/302 |
| 6,680,498 B2 | * | 1/2004 | Guidash | ..................... 257/222 |
| 6,710,804 B1 | * | 3/2004 | Guidash | ..................... 348/302 |

* cited by examiner

*Primary Examiner*—Tuan Ho
(74) *Attorney, Agent, or Firm*—Dickstein Shapiro LLP

(57) ABSTRACT

A high dynamic range imager operates pixels utilizing at least a short integration period and a long integration period. The pixel reading circuits of the imager are adapted to process pixel signals corresponding to the integration periods in parallel. The pixel signals are converted into digital values in parallel. The digital values are each linear functions of the incident light and therefore suitable for use with conventional color processing algorithms. A pipelined rolling shutter operation may be employed where the short integration period of one row of pixels is performed simultaneously with the long integration period of another row of pixels.

34 Claims, 8 Drawing Sheets

HIGH DYNAMIC RANGE IMAGER WITH A ROLLING SHUTTER

FIELD OF INVENTION

The present invention relates generally to semiconductor imagers. More specifically, the present invention relates to methods and apparatus for a semiconductor imager capable of imaging over a high dynamic range of brightness levels.

BACKGROUND OF THE INVENTION

FIG. 1 illustrates a conventional four transistor (4T) imager pixel 100 coupled via column line 125 to a conventional pixel reading circuit 150. The pixel 100 includes a light sensitive element 101, reset, source follower, row select, and transfer transistors 110-114, and nodes A, B, E, and P. Control signals RESET, TX, and ROW are respectively applied to the gates of the reset transistor 110, the transfer transistor 114, and the row select transistor 112. Node A is connected to a supply voltage source (VAAPIX) for the pixel 100. Node E is a floating diffusion, i.e., a charge storage node. Node P is a charge accumulation node of the light sensitive element 101. The outputs produced by the pixel 100 are made available at node B. These outputs include a reset output voltage Vrst present at node B after the resetting of node E by reset transistor 110 and a pixel image signal output voltage Vsig present at node B after the transfer of charge accumulated in the light sensitive element to node E by the transfer transistor 114.

The pixel reading circuit 150 includes a reset signal sample and hold (SH) circuit 151 for sampling and holding the reset signal Vrst. The pixel reading circuit 150 also includes a photo signal sample and hold circuit 152 for sampling and holding the photo signal Vsig. The sample and hold circuits 151, 152 are respectively triggered when control signals SHR, SHS are asserted to sample and hold the reset Vrst and photo Vsig signals. The pixel reading circuit further includes a differential amplifier 160, a bias circuit 170, and nodes C and D. As illustrated, column line 125 couples the output of the pixel at node B to the input of the pixel reading circuit at node C. The output of the differential amplifier 160 is presented at node D.

The pixel 100 is operated by asserting the ROW control signal to cause the row select transistor 112 to conduct. The RESET control signal is asserted to cause a reset voltage from node A (e.g., VAAPIX) to be applied to charge storage node E to cause the pixel 100 to output a reset signal Vrst through transistors 111 and 112. The SHR control signal is asserted to cause the sample and hold circuit 151 to sample and hold the reset signal Vrst. The RESET and SHR control signals are then deasserted. The light sensitive element 101 is exposed to light during a charge integration period, i.e., an exposure period. During the exposure, the light sensitive element 101 produces and stores charge related to the amount of incident light. Charge accumulates at node P based on the intensity of the incident light and the length of the integration period. At the end of the integration period, the accumulated charge is transferred to storage node E by transistor 114 by asserting the TX control signal to cause the pixel 100 to output a photo signal Vsig through transistors 111 and 112. The SHS control signal is asserted to cause the sample and hold circuit 152 to sample and hold the photo signal Vsig. The TX and SHS control signals are then deasserted. Both the reset signal Vrst and the photo signal Vsig are output at node B, albeit at different times. The bias circuit 170 biases the column line 125 to provide a stable signal path for the reset and photo signals Vrst, Vsig.

As noted, the reset signal Vrst is sampled and held by the reset signal circuit 151, while the photo signal Vsig is sampled and held by circuit 152. The sampled and held photo and reset signals are supplied as inputs to differential amplifier 160, which generates the pixel output signal Vpixel= (Vrst−Vsig). As the reset Vrst and photo Vsig signals are produced during the same image frame, this is known as correlated double sampling (CDS) which minimizes the effect of kTC noise associated with the pixel 100 and the pixel reading circuit 150. The resulting pixel output signal Vpixel is output at node D.

FIG. 2 is a block diagram of an imager 200 having a pixel array 201. Pixel array 201 comprises a plurality of pixels 100 arranged in a predetermined number of columns and rows.

Typically, the imager 200 is operated on a rolling shutter basis, in which the rows of pixels are sequentially selected for read out, where each pixel in a selected row outputs its reset Vrst and photo Vsig signals at the same time to a corresponding set of pixel reading circuits. That is, a row of pixels from the array 201 is selected by the control circuit 250 by sending a row address from the control circuit 250 to the row decoder 220. The row decoder 220 decodes the row address and operates the row driver 210. The row driver 210 asserts the ROW control signal on a line coupled to the row select transistor 112 of each pixel in the selected row.

The assertion of the ROW control signal causes the row select transistor 112 of each pixel 100 in the selected row to conduct. The column driver 260 includes the same number of pixel reading circuit 150 as the number of pixels 100 in each row of the pixel array 201, so that each pixel in a selected row is associated with its own pixel reading circuit 150. This permits each pixel 100 in the selected row to output its reset Vrst and photo Vsig signals at node B, which is received at node C of the associated pixel reading circuit 150. Each pixel reading circuit 150 outputs a corresponding pixel output signal Vpixel at node D. The control circuit 250 operates the column decoder 260 to cause the column driver circuit 270 to select a column from the selected pixels. The output from node D of the pixel reading circuit 150 associated with the pixel in the selected column is routed via node D' to an analog to digital converter 280, which converts the output to a digital value.

The analog to digital converter 280 is coupled to an imager processor 290. The image processor operates upon the digital values produced by the analog to digital converter 280 and outputs a processed digital value to the output circuit 295. If the imager 200 is a color imager, it is important that the digital values pixel output signals Vpixel, and thus the corresponding digital values produced by the analog to digitail converter 280, are linear functions of the incident light. The output circuit 295 is used to send the processed digital value to other devices (not illustrated). The other devices may be, for example, an internal storage device, a removable memory device, a display screen, or an external interface.

It is desirable for an imager 200 to be capable of imaging in the presence of a high level of dynamic range in the brightness of the light incident upon the pixels 100. It is desirable for the imaging to be performed as a linear function of incident light. However, for any given integration period, in the presence of incident light having a high level of brightness, there is a danger of overexposure due to the light sensitive element 101 producing too many photo generated charges. Conversely, in the presence of incident light having a low level of brightness, there is a danger of underexposure due to the light sensitive element 101 producing too few photo generated charges. Accordingly, there is a need and desire for an imager capable of linearly operating over a high dynamic range.

SUMMARY OF THE INVENTION

Exemplary embodiments of the method and apparatus of the present invention provide an imager with a rolling shutter which operates each pixel using both a short integration period and a long integration period. Thus, at any given point in time, different rows of the imager may be at different stages of either a short integration period or a long integration period. Analog pixel signals of both integration periods are read by a pixel reading circuit, which provides parallel signal paths for both integration periods and generates a short integration pixel output signal and a long integration pixel output signal. Both pixel output signals are digitized to produce corresponding digital values. Both digital values are respectively linear functions of the incident light.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE INVENTION

Figure 1:
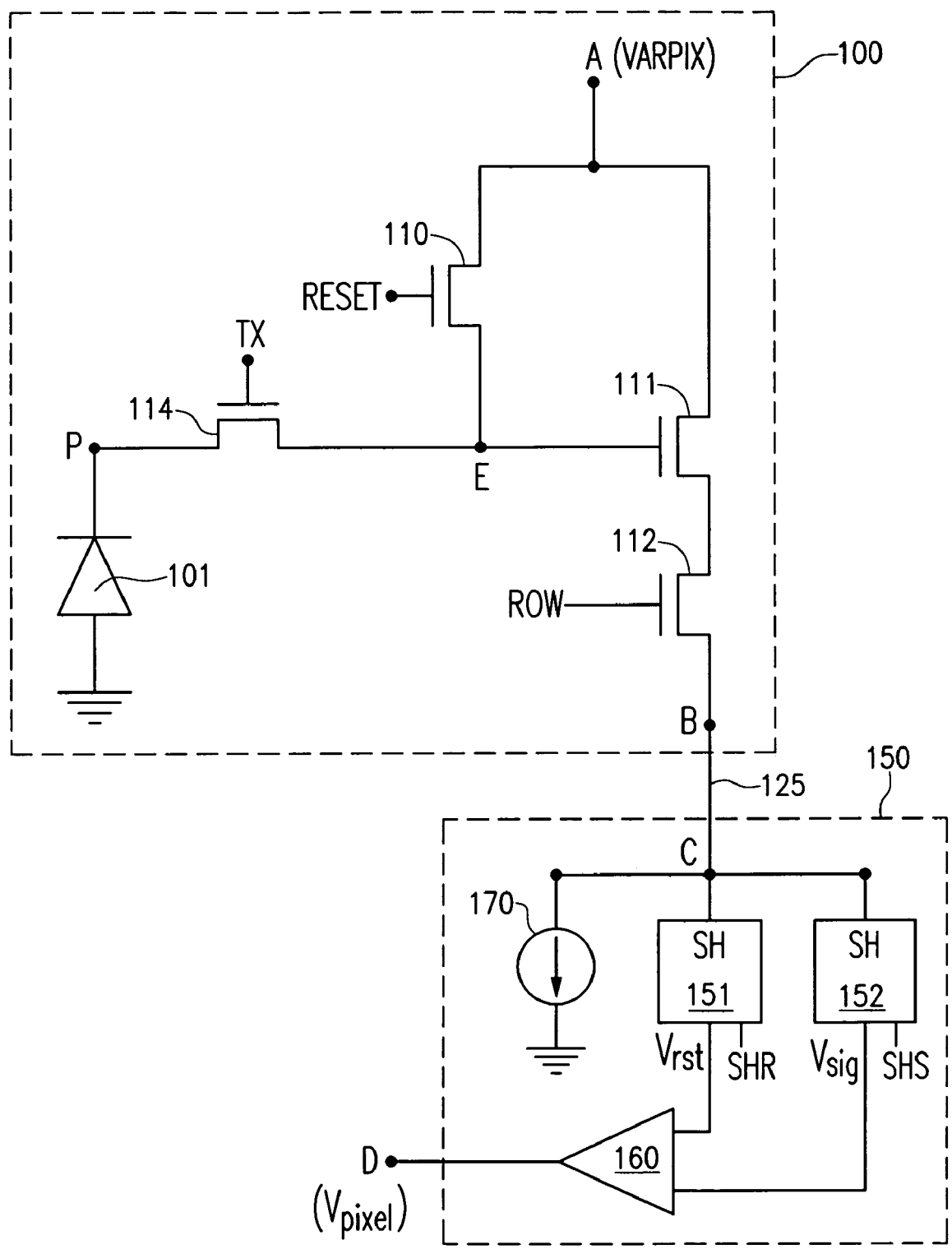
FIG. 1 illustrates a conventional pixel.
Figure 3:
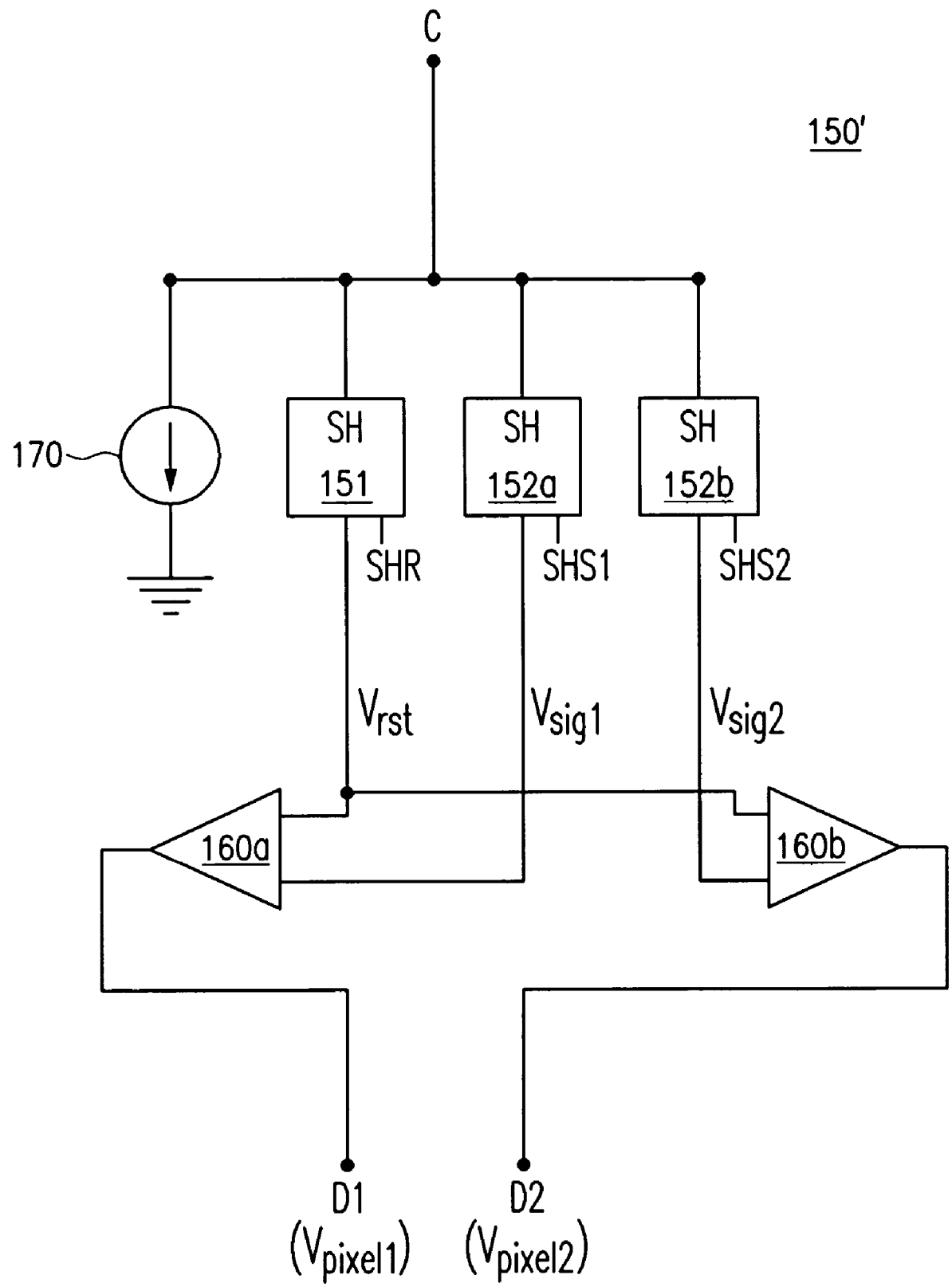
FIG. 3 illustrates a pixel reading circuit in accordance with one exemplary embodiment of the invention.

Now referring to the drawings, where like reference numerals designate like elements, there is shown in FIG. 3 a pixel reading circuit 150' in accordance with an exemplary embodiment of the present invention. The pixel reading circuit 150' is a replacement for the conventional pixel reading circuit 150 (FIG. 1) and is compatible with the conventional pixel 100. Preferably, the conventional pixel 100 utilizes a pinned photodiode as a light sensitive element 101. The pixel reading circuit 150' includes one input node C and two output nodes D1, D2. Coupled in parallel to the input node C is a bias circuit 170, a sample and hold circuit 151 for the reset signal Vrst, a short integration (SI) sample and hold circuit 152a for a SI photo signal Vsig1, and a long integration (LI) sample and hold circuit 152b for a LI photo signal Vsig2. In the context of this invention, a short integration time is shorter in duration than a long integration time. The three sample and hold circuits 151, 152a, 152b are also coupled to SI and LI differential amplifiers 160a, 160b. The SI differential amplifier 160a forms at node D1 a SI pixel output signal Vpixel1 from the signals received from sample and hold circuits 151, 152a while the LI differential amplifier 160b forms at node D2 a LI pixel output signal Vpixel2 from the signal received from the sample and hold circuits 151, 152b.

Figure 2:
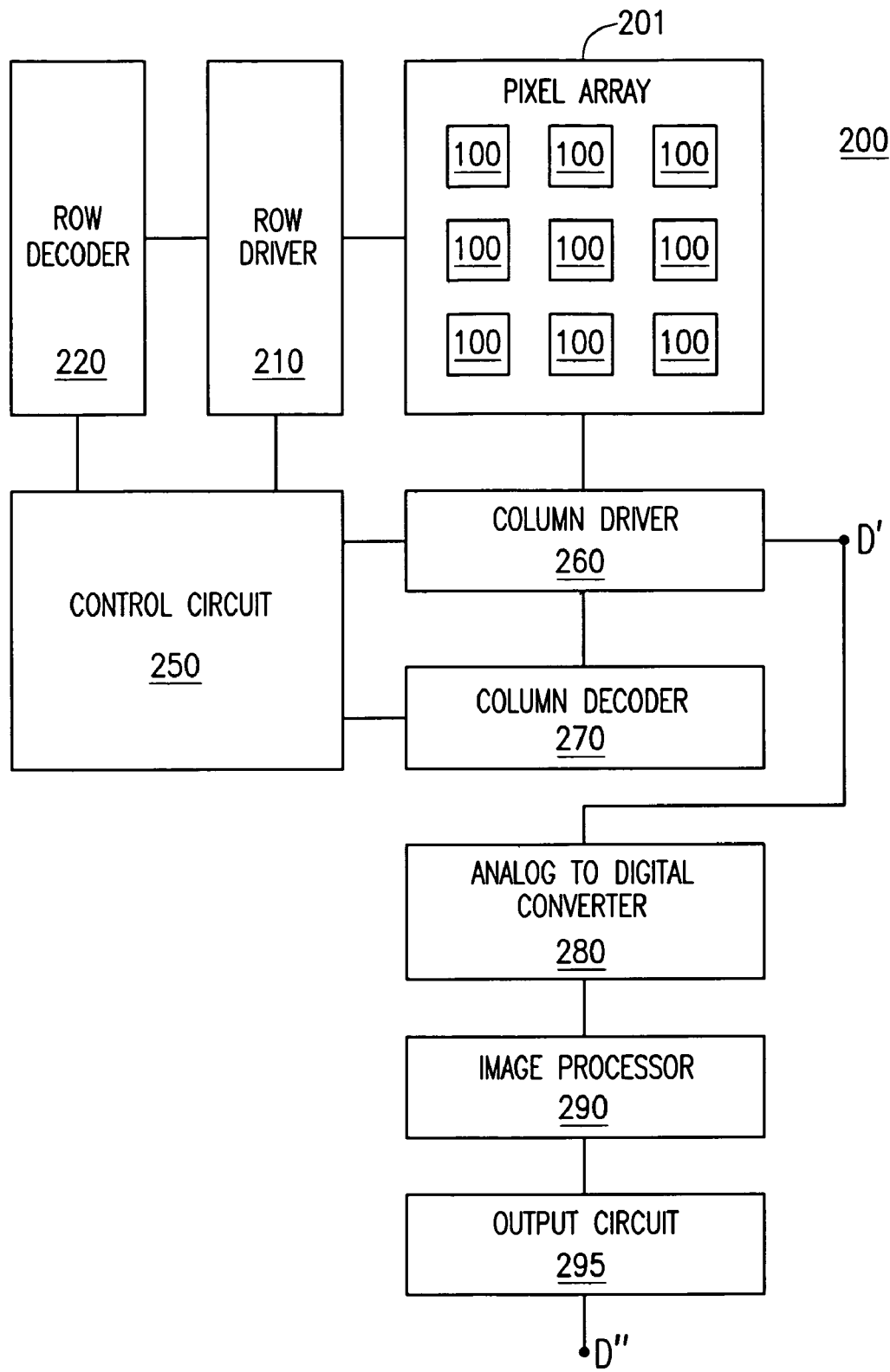
FIG. 2 illustrates a conventional imager.
Figure 4:
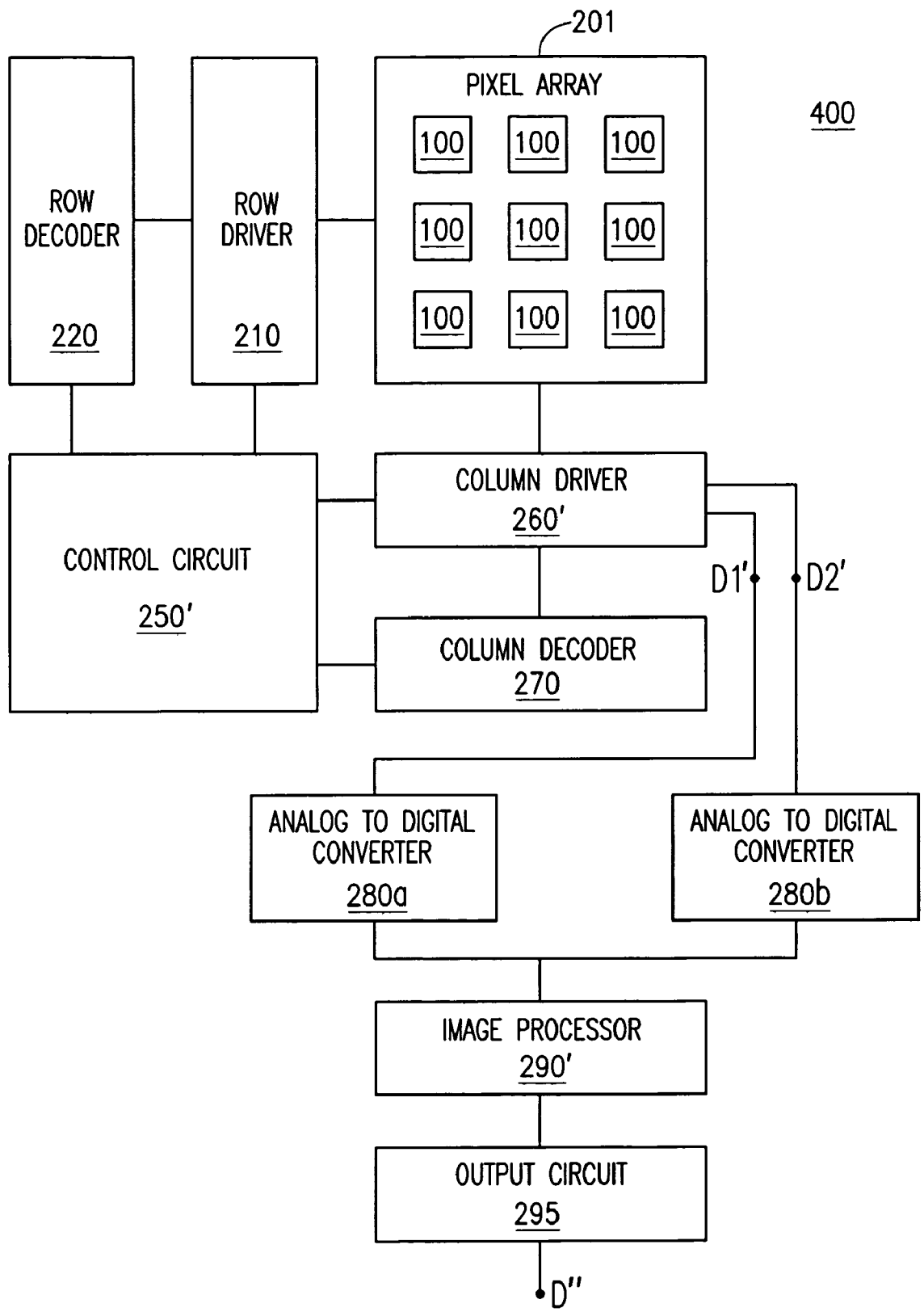
FIG. 4 illustrates an imager in accordance with one exemplary embodiment of the invention.

FIG. 4 is an illustration of an imager 400 according to one exemplary embodiment of the present invention. The imager 400 includes the same pixel array 201 of pixels 100 as the imager 200 (FIG. 2). The imager 400 also includes the same row decoder 220, row driver 210, a new control circuit 250', and column decoder 270, and output circuit 295 as the imager 200. The new control circuit 250' is modified to perform the processing discussed below with respect to FIG. 5.

The imager 400 includes a new column driver 260'. The new column driver 260' includes a plurality of the pixel output circuits 150' illustrated in FIG. 3, and outputs a SI pixel signal at node D1 Vpixel1 and a LI pixel signal Vpixel2 at node D2.

Node D1 is coupled to a SI analog to digital converter 280a, while node D2 is coupled to a LI analog to digital converter 280b. The SI and LI analog to digital converter 280a, 280b may each be identical to the analog digital converter 280 (FIG. 2).

The image processor 290' is coupled to both analog to digital converters 280a, 280b and may accept digital values produced by both analog to digital converters 280a, 280b for further processing. The processed result is supplied to an output circuit 295, which may be coupled to another device via node D", as previously discussed in connection with FIG. 2.

Figure 5:
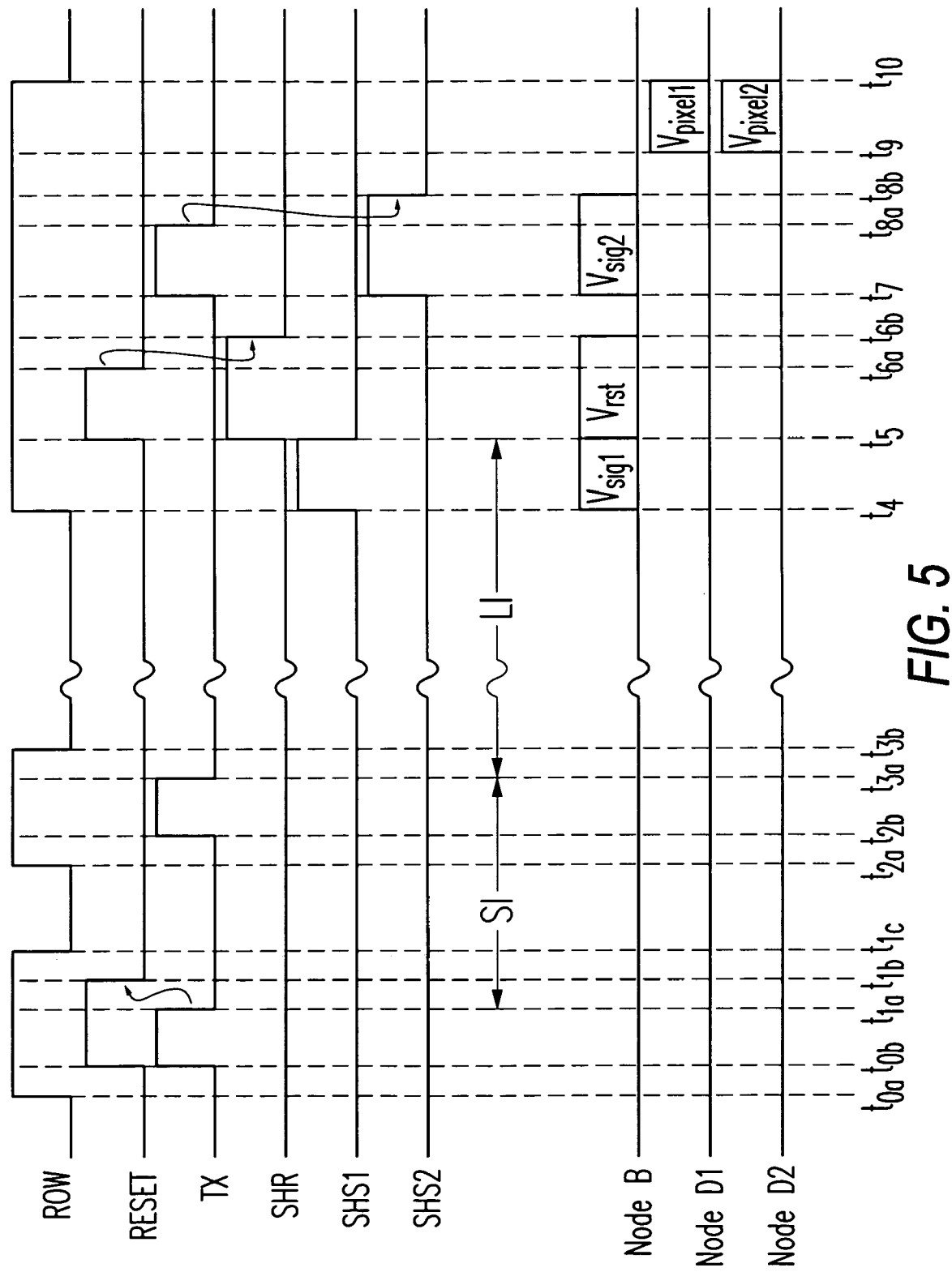
FIG. 5 is a timing diagram for the imager of FIG. 4.

Now also referring to FIG. 5, the operation of the pixel reading circuit 150' and the imager 400 can be explained. FIG. 5 is a timing diagram illustrating the states of control signals ROW, RESET, TX, SHR, SHS1, SHS2, and the signals output at nodes B, D1, and D2. In order to better illustrate the invention, the timing diagram of FIG. 5 is drawn with respect to only one arbitrary row of pixels. However, it should be noted that the imager 400 preferably employs a rolling shutter, in which the timing of operations is staggered between different rows of pixels. Accordingly, if N and M are integers and the timing diagram of FIG. 5 illustrates the timing sequence of, for example, a row N of pixels, the timing of operations for a row N+M would be identical in sequence, but the specific timing of the below described times will be at an offset.

At an initial time t0a, the ROW control signal corresponding to the selected row is asserted high and the SHR, SHS1, SHS2 control signal are asserted low.

At time t0b, the RESET and TX control signals are also asserted high.

At time t1a, the TX control signal is asserted low for each pixel in the selected row.

At time t1b, the RESET control signal is asserted low for each pixel in the selected row. With both the TX and RESET control signals asserted low, photo generated charges begin to accumulate at node P of each pixel in the selected row, thereby starting the short integration period SI at time t1a.

At time t1c, the ROW control signal is asserted low.

At time t2a, the ROW control signal is asserted high.

At time t2b, the TX control signal is asserted high. This causes the transfer transistor 114 to conduct. Photo generated charges are transferred from the photodiode 101 via accumulation node P to charge storage node E. The transferred photo generated charges reduce the voltage level of charge node E, which is coupled to the gate of the source follower transistor 111.

At time t3a, the TX control signal for the selected row is asserted low. New photo generated charges now accumulate at accumulation node P and are not transferred to the charge storage node E because the transfer transistor 114 is now non-conducting. The voltage at the charge storage node E is now not affected by new photo generated charges. This marks the end of the short integration period SI, and starts a long integration period LI.

At time t3b, the ROW control signal is asserted low.

At time t4, the ROW control signal of the selected row is asserted high. This causes the row select transistor 112 to conduct. The photo signal corresponding to the short integration period is output at node B. Simultaneously, the SHS1 control signal is asserted high. The photo signal associated with the short integration period Vsig1 is output at node B, and sampled and held by the SI sample and hold circuit 152a.

At time t5, the SHS1 control signal is asserted low, and the RESET control signal is asserted high. This sets the charge storage node E to a predetermined voltage and the reset signal Vrst is output at node B. Simultaneously, the SHR control signal is asserted high, causing sample and hold circuit 151 to sample and hold the reset signal.

At time t6a, the RESET control signal is asserted low. At time t6b, the SHR control signal is asserted low. The reset signal Vrst is no longer output at node B.

At time t7, the TX and SHS2 control signals are asserted high. This causes the transfer transistor 114 to conduct, which transfers charges accumulated at the accumulation node P during the long integration period LI to the charge storage node E. This decreases the voltage at the charge storage node, and thus, the voltage at the gae of the source follower transistor 111. The photo signal associated with the long integration period Vsig2 is output at node B and sampled and held by the sample and hold circuit 152b.

At time t8a, the TX control signal is asserted low.

At time t8b, the SHS2 control signal is asserted low. The photo signal associated with the long integration period Vsig2 is no longer output at node B.

By now the sample and hold circuits 151, 152a, 152b respectively hold the reset signal, the short integration photo signal Vsig1, and the long integration period photo signal Vsig2.

At time t9, the SI differential amplifier 160a now generates a short integration pixel output signal Vpixel1 at node D1 using the reset signal Vrst and the SI photo signal Vsig1. This signal Vpixel1 is not a true correlated double sampled signal as the SI photo signal Vsig1 and reset signal Vrst were not sampled back-to-back. The LI differential amplifier 160b also generates the LI pixel output signal Vpixel2 at node D2 using the reset signal Vrst and the long integration photo signal Vsig2. This signal Vpixel2 is a true correlated double sampled signal.

At time t10, the output of the Vpixel1 and Vpixel2 signal has completed.

The two pixel output signal Vpixel1, Vpixel2 are respectively supplied to analog to digital converters 280a, 280b to produce corresponding digital values, which can then be processed by image processor 290', and output to another device via output circuit 295. Because the SI and LI pixel output signals Vpixel1, Vpixel2 were not fused together in the analog domain, each signal Vpixel1, Vpixel2 is a (different) linear function of the incident light, and each signal is therefore compatible with conventional color processing algorithms.

The present invention therefore provides for a pixel reading circuit 150' which samples and holds a plurality of photo signals taken over different integration periods. The SI pixel output signal is suitable if the incident light is of a high brightness level. Although this signal is not generated using correlated double sampled signal, kTC noise should be of little concern as a high brightness environment would have a good signal to noise ratio (i.e., the signal level will be high in comparison to the kTC noise level at high levels of brightness). The LI pixel output signal is suitable if the incident light is of a low brightness level, as the signal to noise ratio of this signal is optimized by using correlated double sampling, which minimizes the affect of kTC noise. The present invention also provides for parallel processing and output of the pixel output signal formed from the different integration period in order. The pixel output signals are not fused or combined until after digitization. This permits each pixel output signal Vpixel1, Vpixel2 to have be linear functions of incident light, which is advantageous for color processing by the image processor 290'. The image processor 290' may, for example, operate the digital value(s) corresponding to either or both pixel output signals Vpixel1, Vpixel2.

Figure 6A:
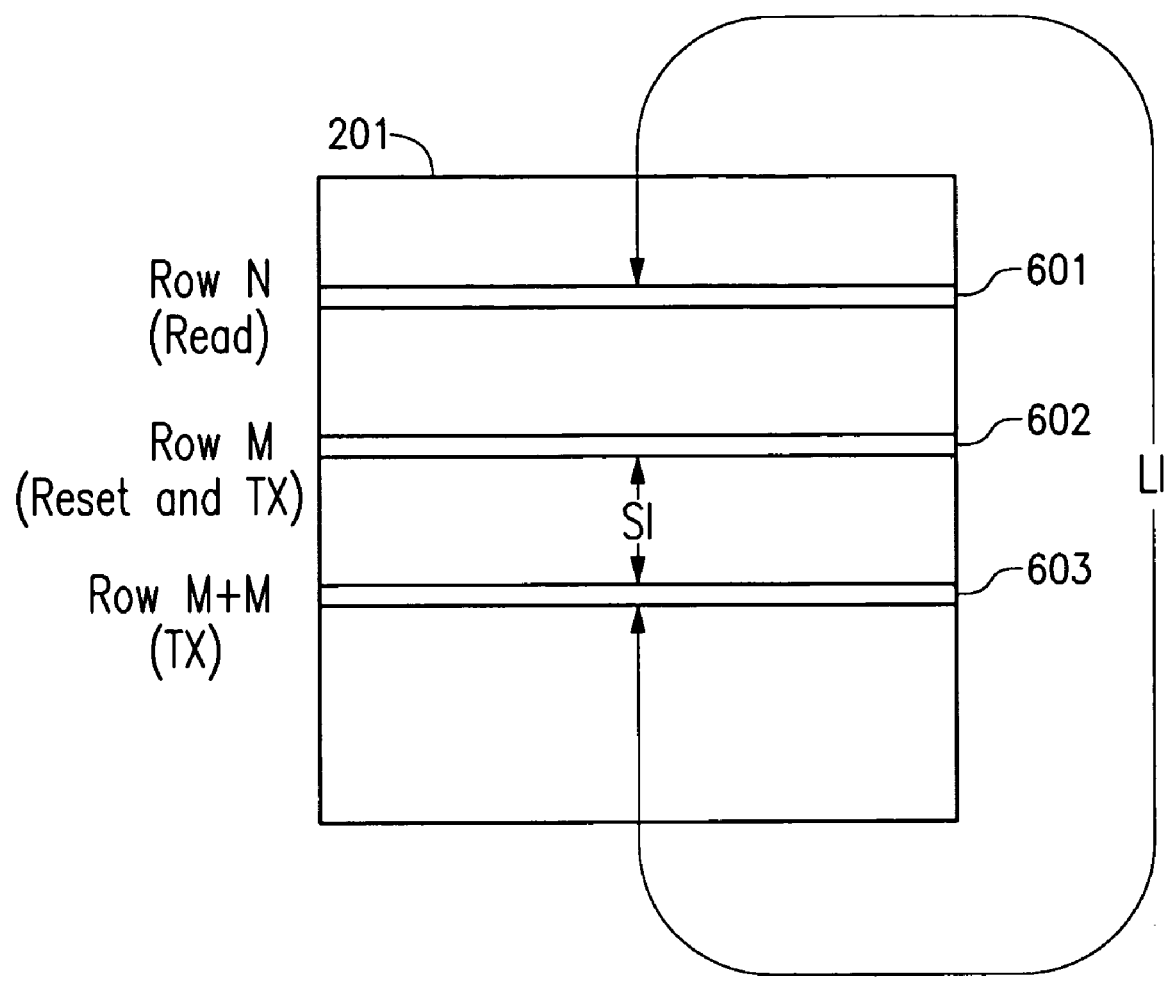
FIGS. 6A and 6B illustrate pipelined modes of operation for a pixel array according to the invention.
Figure 6B:
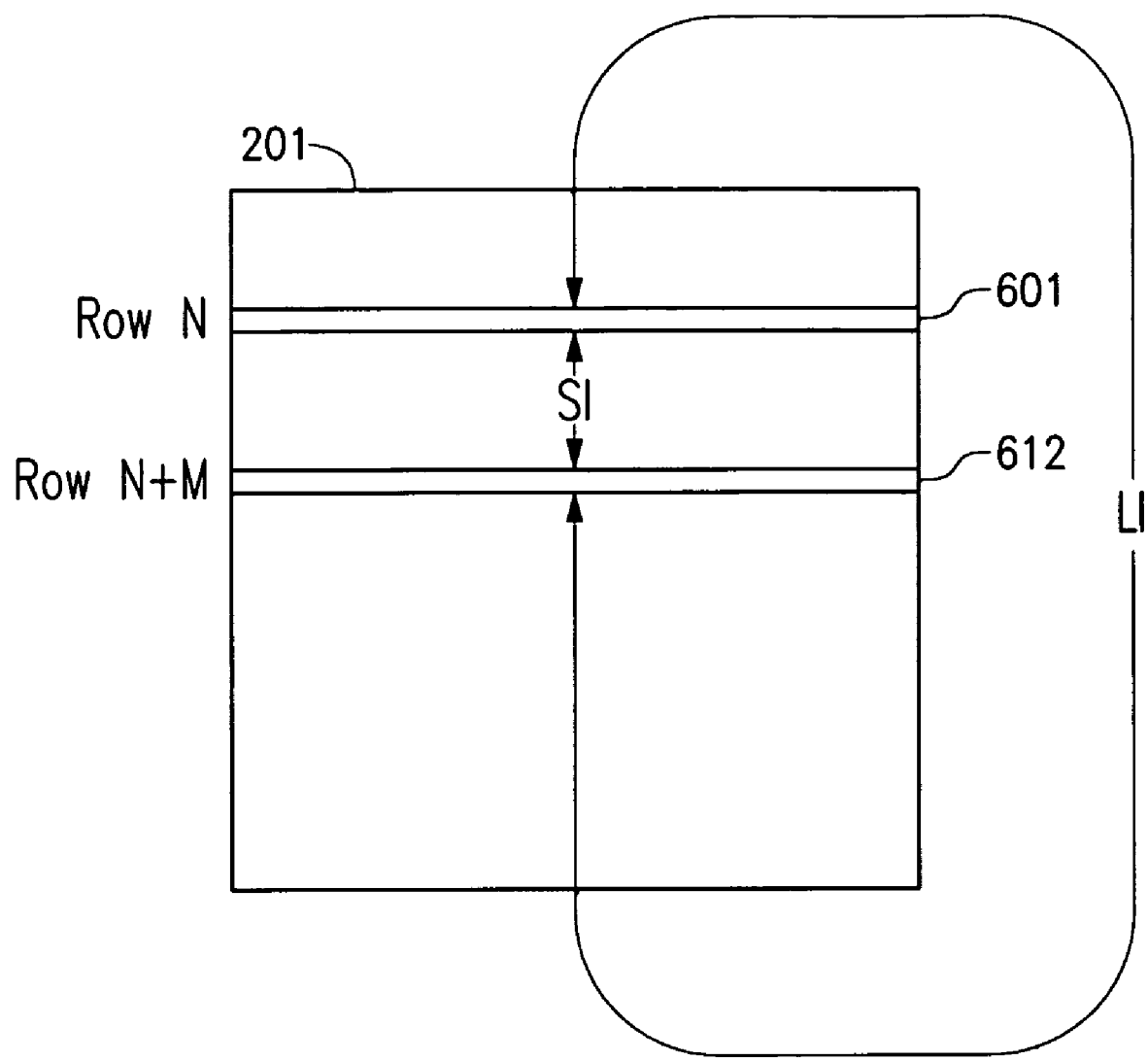

Referring now to FIGS. 6A and 6B, it can be seen that another aspect of the invention permits the read out of rows of the pixel array 201 to be performed in a pipelined manner. For example, FIG. 6A illustrates that a read out of a LI signal from Row N 601 can be performed at the same time a SI signal is being accumulated at Row m 602, while a read out of the SI signal can be performed on a Row n+M 603. The time for the SI corresponds to the time to read out M rows, while the time for the LI corresponds to the Nrows−M−(m−n)+VB, where Nrow is the number of rows in the pixel array 201 and VB is the time required for a vertical blanking period. Alternatively, FIG. 6B illustrates when the sum of the SI and LI periods equal one frame time. FIG. 6B illustrates that under such circumstances, the LI signal read out of Row N 601 can be performed simultaneously with the SI signal read out of row N+M 612.

The image processor 290' takes the digital output from analog to digital converters 280a and 280b for each pixel and digitally processes the signals to produce a representation of the image having a higher dynamic range than that created by the image processor 290 (FIG. 2) of a conventional imager 200. In the present invention, at least one of the digital values should be a linear function of the incident light. For example, under low brightness levels, the digital output associated with the long integration should have good noise characteristics and be a linear function since the pixel should not saturate. Under high brightness levels, the digital output associated with the long integration might be non-linear due to pixel saturation, but the digital output associated with the short integration should still be linear because it should not saturate. The ability to retain a linear mode of operation is advantageous if the imager 400 is a color imager and the image processor 290' performs color processing, as many color processing algorithms are intended to be used with linear systems.

Figure 7:
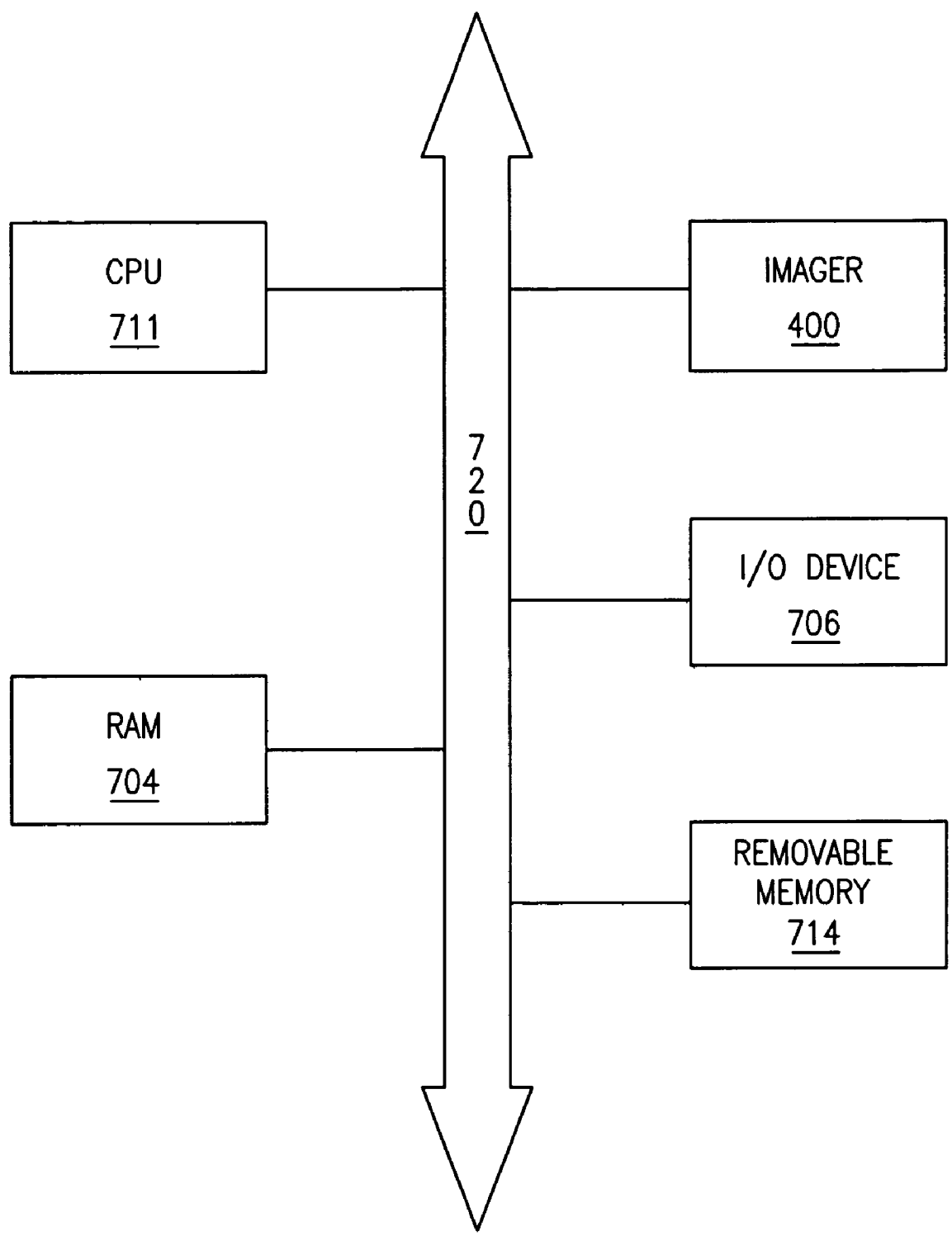
FIG. 7 illustrates a processing system incorporating the imager of FIG. 4.

FIG. 7 shows system 700, a typical processor system modified to include an imager 400 of the present invention. The system 700 is exemplary of a system having digital circuits that could include image sensor devices. Without being limiting, such a system could include a computer system, camera system, scanner, machine vision, vehicle navigation, video phone, surveillance system, auto focus system, star tracker system, motion detection system, image stabilization system, and data compression system.

System 700, for example a camera system, generally comprises a central processing unit (CPU) 702, such as a microprocessor, that communicates with an input/output (I/O) device 706 over a bus 720. Imaging device 400 also communicates with the CPU 702 over the bus 720. The system 700 also includes random access memory (RAM) 704, and can include removable memory 714, such as flash memory, which also communicate with the CPU 702 over the bus 720. The imager 400 may be combined with a processor, such as a CPU, digital signal processor, or microprocessor, with or without memory storage on a single integrated circuit or on a different chip than the processor.

It should be appreciated that other embodiments of the invention include a method of manufacturing the imager 400 of the invention as illustrated in FIG. 4. For example, in one exemplary embodiment, a method of manufacturing an imager includes the steps of providing a column driver circuit having a plurality of the pixel reading circuits 150' of FIG. 3. The method of manufacturing may also include the steps of providing independent analog to digital converters for digitizing the pixel signals from the short and long integration periods in parallel. In addition, the pixel reading circuit 150' of FIG. 3, and/or the imager 400 of FIG. 4 can be fabricated as part of an integrated circuit fabrication method using known fabrication techniques.

While the invention has been described in detail in connection with the exemplary embodiments, it should be understood that the invention is not limited to the above disclosed embodiments. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. An imaging circuit, comprising:
   a pixel comprising a photodiode for photo-generating charge, a charge storage region for storing said charge, a floating diffusion region, and a charge transfer transistor for transferring charge from said charge storage region to said floating diffusion region;
   a signal input node for receiving a reset signal, a first photo signal, and a second photo signal;
   a first sample and hold circuit for receiving said first photo signal from said signal input node, said first photo signal representing an amount of charge generated by said photodiode;
   a second sample and hold circuit for receiving said second photo signal from said signal input node, said second photo signal representing an amount of charge generated by said photodiode;
   a third sample and hold circuit coupled to said signal input node;
   a first output circuit, coupled to receive signals from said first and second sample and hold circuits; and
   a second output circuit, coupled to receive signals from said first and third sample and hold circuits.

2. The imaging circuit of claim 1, further comprising a bias circuit, coupled to said signal input node.

3. The imaging circuit of claim 2, wherein said bias circuit and said first, second, and third sample and hold circuits are coupled in parallel to said signal input node.

4. The imaging circuit of claim 1, wherein said first and second output circuit each comprise a differential amplifier.

5. The imaging circuit of claim 1, wherein said first photo signal is associated with a first integration period of said photodiode and said second photo signal is associated with a second integration period of said photodiode.

6. The imaging circuit of claim 5, wherein said second integration period is longer than said first integration period.

7. An imager, comprising:
   a pixel array comprising a plurality of pixels arranged in a plurality of rows and a plurality of columns;
   a plurality of pixel reading circuits, each of said pixel reading circuits comprising:
     a first, second, and third sample and hold circuits, for respectively sampling and holding a reset signal, a first photo signal, and a second photo signal, from one of said plurality of pixels, said first and second photo signals representing charge generated by the same photodiode of said one of said plurality of pixels;
     a first output circuit for producing a first pixel signal from said reset signal and said first photo signal; and
     a second output circuit for producing a second pixel signal from said reset signal and said second photo signal;
   a first analog to digital converter, coupled to said first output circuit, for producing a first digital value corresponding to said first pixel signal; and
   a second analog to digital converter, coupled to said second output circuit, for producing a second digital value corresponding to said second pixel signal.

8. The imager of claim 7, further comprising:
   an image processor coupled to said first and second analog to digital converters, said image processor receiving said first and second digital values;
   wherein said image processor
     calculates a first intermediate result by performing linear arithmetic operations on said first digital value,
     calculates a second intermediate result by performing linear arithmetic operations on said second digital value, and
     calculates a next result by performing arithmetic operations on said first and second intermediate results.

9. The imager of claim 8, wherein said image processor performs color processing upon at least one of said first and second digital values.

10. The imager of claim 7, further comprising a controller coupled to said pixel array and said plurality of pixel reading circuits, wherein said controller operates said plurality of pixels over a short integration period and a long integration period.

11. The imager of claim 10, wherein said first photo signal is associated with said short integration period and said second photo signal is associated with said long integration period.

12. A system, comprising:
   a processor;
   an imager coupled to said processor, said imager comprising:
     a pixel array comprising a plurality of pixels arranged in a plurality of rows and a plurality of columns;
     a plurality of pixel reading circuits, each of said pixel reading circuits comprising:
       a first, second, and third sample and hold circuits, for respectively sampling and holding a reset signal, a first photo signal, and a second photo signal, from one of said plurality of pixels, said first and second photo signals representing charge generated by the same photodiode of said one of said plurality of pixels;
       a first output circuit for producing a first pixel signal from said reset signal and said first photo signal; and
       a second output circuit for producing a second pixel signal from said reset signal and said second photo signal;
     a first analog to digital converter, coupled to said first output circuit, for producing a first digital value corresponding to said first pixel signal; and
     a second analog to digital converter, coupled to said second output circuit, for producing a second digital value corresponding to said second pixel signal.

13. The imager of claim 12, further comprising:
   an image processor coupled to said first and second analog to digital converters, said image processor receiving said first and second digital values;
   wherein said image processor
     calculates a first intermediate result by performing linear arithmetic operations on said first digital value, calculates a second intermediate result by performing linear arithmetic operations on said second digital value, and calculates a next result by performing arithmetic operations on said first and second intermediate results.

14. The imager of claim 13, wherein said image processor performs color processing upon at least one of said first and second digital values.

15. The imager of claim 12, further comprising a controller coupled to said pixel array and said plurality of pixel reading circuits, wherein said controller operates said plurality of pixels over a short integration period and a long integration period.

16. The imager of claim 15, wherein said first photo signal is associated with said short integration period and said second photo signal is associated with said long integration period.

17. A method for reading a pixel, comprising:
(a) sampling and holding a first photo signal representing charge generated by a photodiode of said pixel during a first integration period;
(b) sampling and holding a reset signal from said pixel;
(c) sampling and holding a second photo signal representing charge generated by said photodiode of said pixel during a second integration period different than said first integration period;
(d) forming a first output signal from said first photo signal and said reset signal; and
(e) forming a second output signal from said second photo signal and said reset signal.

18. The method of claim 17, wherein step (b) is performed between step (a) and step (c).

19. The method of claim 18, wherein step (d) is performed after step (a) and step (b).

20. The method of claim 18, wherein step (e) is performed after step (b) and step (c).

21. The method of claim 17, wherein step (d) and step (e) overlap in time.

22. The method of claim 17, wherein step (d) and step (e) are performed at a same time.

23. The method of claim 17, further comprising:
(f) digitizing said first output signal to produce a first digital value; and
(g) digitizing said second output signal to produce a second digital value.

24. The method of claim 23, wherein step (f) and step (g) overlap in time.

25. The method of claim 23, wherein step (f) and step (g) are performed at a same time.

26. The method of claim 23, further comprising:
(h) after steps (f) and (g), performing linear arithmetic operations on said first and second digital values to respectively obtain a first and second intermediate results; and
(i) after step (h), performing arithmetic operations on said first and second intermediate results.

27. A method of operating an imager, comprising:
(a) selecting a first row from a plurality of rows within a pixel array, each row comprising a plurality of pixels, each pixel comprising a photodetector for accumulating charge in response to light, a charge accumulation node, and a charge transfer transistor for transferring charge from said photodetector to said charge accumulation node;
(b) resetting each pixel in said first row to start a first integration period;
(c) in each pixel of said first row, activating said charge transfer transistor to cause a first transfer of first charge, accumulated by said photodetector during said first integration period, to said charge accumulation node, and starting a second integration period after said first transfer of charge to accumulate second charge at said photodetector;
(d) in each pixel of said first row, outputting a first photo signal representing said first charge accumulated during said first integration period;
(e) resetting each pixel in said first row to output a first reset signal; and
(f) in each pixel of said first row, outputting a second photo signal representing said second charge accumulated during said second integration period.

28. The method of claim 27, further comprising:
in each pixel of said first row,
forming a first pixel signal from said first photo signal and said first reset signal; and
forming a second pixel signal from said second photo signal and said first reset signal.

29. The method of claim 27, further comprising:
in each pixel of said first row,
forming a first digital value by digitizing said first pixel signal; and
forming a second digital value by digitizing said second pixel signal.

30. The method of claim 27, wherein said second integration period is longer than said first integration period.

31. The method of claim 27, further comprising:
(g) selecting a second row from said plurality of rows;
(h) resetting each pixel in said second row to start a third integration period;
(i) in each pixel of said second row, starting a second transfer of third charge, accumulated by said photodetector during said third integration period, to said charge accumulation node, and starting a fourth integration period after said second transfer of charge to accumulate fourth charge said photodetector;
(j) in each pixel of said second row, outputting a third photo signal representing said third charge accumulated during said third integration period;
(k) resetting each pixel in said second row to output a second reset signal; and
(l) in each pixel of said second row, outputting a fourth photo signal representing said fourth charge accumulated during said fourth integration period.

32. The method of claim 31, wherein steps (g), (h), and (i) are performed after steps (a), (b), and (c).

33. The method of claim 32, wherein steps (d), (e), and (f) are performed after steps (g), (h), and (i).

34. The method of claim 33, wherein steps (j), (k), and (l) are performed after steps (d), (e), and (f).

* * * * *